(12) United States Patent
Kanamori et al.

(10) Patent No.: US 12,249,939 B2
(45) Date of Patent: Mar. 11, 2025

(54) OPEN WINDING MOTOR DRIVING DEVICE

(71) Applicant: CARRIER JAPAN CORPORATION, Tokyo (JP)

(72) Inventors: Masaki Kanamori, Fuji (JP); Yoshitaka Uchiyama, Fuji (JP); Keiichi Kato, Fuji (JP); Kenta Yamamoto, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 7 days.

(21) Appl. No.: 17/926,764

(22) PCT Filed: Sep. 10, 2020

(86) PCT No.: PCT/JP2020/034281
§ 371 (c)(1),
(2) Date: Nov. 21, 2022

(87) PCT Pub. No.: WO2022/054199
PCT Pub. Date: Mar. 17, 2022

(65) Prior Publication Data
US 2023/0208339 A1  Jun. 29, 2023

(51) Int. Cl.
*H02P 27/08* (2006.01)

(52) U.S. Cl.
CPC .................... *H02P 27/085* (2013.01)

(58) Field of Classification Search
CPC ........ H02P 27/085; H02P 27/12; H02P 21/18; H02M 1/123; H02M 7/53871; H02M 7/5395
See application file for complete search history.

(56) References Cited

U.S. PATENT DOCUMENTS 10,476,419 B2 * 11/2019 Park .................... H02P 21/12
2006/0067655 A1 * 3/2006 Okuda ............. H02M 7/53873
388/805

(Continued)

FOREIGN PATENT DOCUMENTS

DE   102014210627 A1 * 12/2015 .......... B60L 11/1803
JP   2019170119 A * 10/2019

(Continued)

OTHER PUBLICATIONS

Somasekhar, "A Novel PWM Inverter Switching Strategy for a Dual Two-level Inverter Fed Open-end Winding Induction Motor Drive", 2001, IEEE, 196-202 (Year: 2001).*

(Continued)

*Primary Examiner* — Bickey Dhakal
(74) *Attorney, Agent, or Firm* — Maier & Maier, PLLC (57) ABSTRACT

A primary-side inverter is connected to three output terminals of six output terminals included in a motor with an open winding structure including windings of three independent phases and a secondary-side inverter is connected to the remaining three output terminals. Direct current power is supplied to the inverters, and a control device performs PWM control on the inverters by using a switching pattern in which the numbers of phases where each is turned on are equal, and in the switching pattern, ON of only an upper is continued in one phase from among the three phase outputs, OFF of only a lower is continued in another phase, and the upper and lower are alternately turned on and off such that mutual phases are opposite in the remaining one phase in one cycle of an electric angle of the motor over a plural carrier cycles in PWM control.

4 Claims, 9 Drawing Sheets

(56) References Cited

U.S. PATENT DOCUMENTS

| | | | | |
|---|---|---|---|---|
| 2006/0108957 A1* | 5/2006 | Urakabe | ................. | H02P 27/06 |
| | | | | 318/400.28 |
| 2020/0389115 A1 | 12/2020 | Saha et al. | | |
| 2022/0286066 A1* | 9/2022 | Nishio | ................. | H02M 1/008 |

FOREIGN PATENT DOCUMENTS

| | | | |
|---|---|---|---|
| JP | 2020031458 A | | 2/2020 |
| JP | 202096457 A | | 6/2020 |
| KR | 20240029705 A | * | 3/2024 |
| WO | 2016125557 A1 | | 8/2016 |
| WO | 2019142877 A1 | | 7/2019 |

OTHER PUBLICATIONS

International Search Report issued on Nov. 17, 2020, in corresponding International Application No. PCT/JP2020/034281, 4 pages.
Extended European Search Report issued on May 2, 2024, in corresponding European Application No. 20953264.7, 8 pages.
Rajeevan et al., "Common Mode Voltage Elimination Scheme for Dual-Inverter fed Five Phase AC Drives with Open-end Stator Windings", Industrial Technology, IEEE International Conference, Feb. 25, 2013, pp. 1680-1685.

* cited by examiner

OPEN WINDING MOTOR DRIVING DEVICE

TECHNICAL FIELD

Embodiments of the present invention relate to a device that drives a motor with an open winding structure.

BACKGROUND ART

There is a technique of driving an open winding motor by two inverters. According to the technique, it is possible to increase output voltages of the inverters in a case where the motor is caused to rotate at a high speed or the like. Therefore, a significantly high effect can be expected when this is applied to driving of a compressor of a heat pump device such as an air conditioning device or a heat source device that requires a wide operation range from a time of lightly-loaded slow rotation to heavily loaded fast rotation.

Although a DC link sharing scheme in which direct current link voltage of two inverters are shared as disclosed in Patent Literature 1, for example, from among a plurality of driving schemes as described above is the simplest configuration that does not require circuit insulation and the like, a zero-axis current flows to the motor. The zero-axis current is caused since a path that flows in the same direction through windings of three phases of the motor and flows backward via any of upper and lower direct current link portions is formed. Since the zero-axis current increases for a motor a harmonic component of the motor current, there are problems that torque ripple increases and a loss of the inverters increases.

CITATION LIST

Patent Literature

Patent Literature 1: international Publication No. WO 2016/125557
Patent Literature 2: Japanese Patent Laid-Open No. 2020-31458

SUMMARY OF INVENTION

Technical Problem

The zero-axis current is categorized into a triple-frequency component of a motor current frequency and a carrier frequency component used for PWM control. While the triple-frequency component has a relatively low frequency and can thus be handled by feedback or the like (see Patent Literature 2), the carrier frequency component occurs at every switching cycle, and it is thus necessary to consider a method for generating a signal for driving inverters.

Also, if an open winding motor is driven by two inverters, a common mode voltage is applied from both ends of the motor winding, and the apparent earth capacity becomes higher than that of a typical star-connected motor that is driven by one inverter, which leads to a significant increase in common mode noise.

Thus, an open winding motor driving device capable of curbing a carrier frequency component of a zero-axis current and reducing common mode noise is provided.

Solution to Problem

An open winding motor driving device according to an embodiment includes: a primary-side inverter that is connected to three output terminals from among six output terminals included in a motor with an open winding structure including the six output terminals and including windings of three phases that are independent of each other; a secondary-side inverter that is connected to the remaining three output terminals of the output terminals of the motor; and a control unit that controls a current to be distributed to the motor and a rotation speed by controlling the primary-side and secondary-side inverters. Additionally, direct current power is supplied to the primary-side and secondary-side inverters, the control unit performs PWM control on the primary-side and secondary-side inverters by using a switching pattern in which the numbers of phases where each switching element is turned on are equal, and the opening winding motor driving device has a switching pattern in which ON of only an upper switching element is continued in one phase out of three phase outputs, ON of only a lower switching element is continued in another phase, and the upper and lower switching elements are alternately turned on and off such that mutual phases are opposite in the remaining one phase, in one cycle of an electric angle of the motor over a plurality of carrier cycles in the PWM control.

DESCRIPTION OF EMBODIMENTS

First Embodiment

Figure 1:
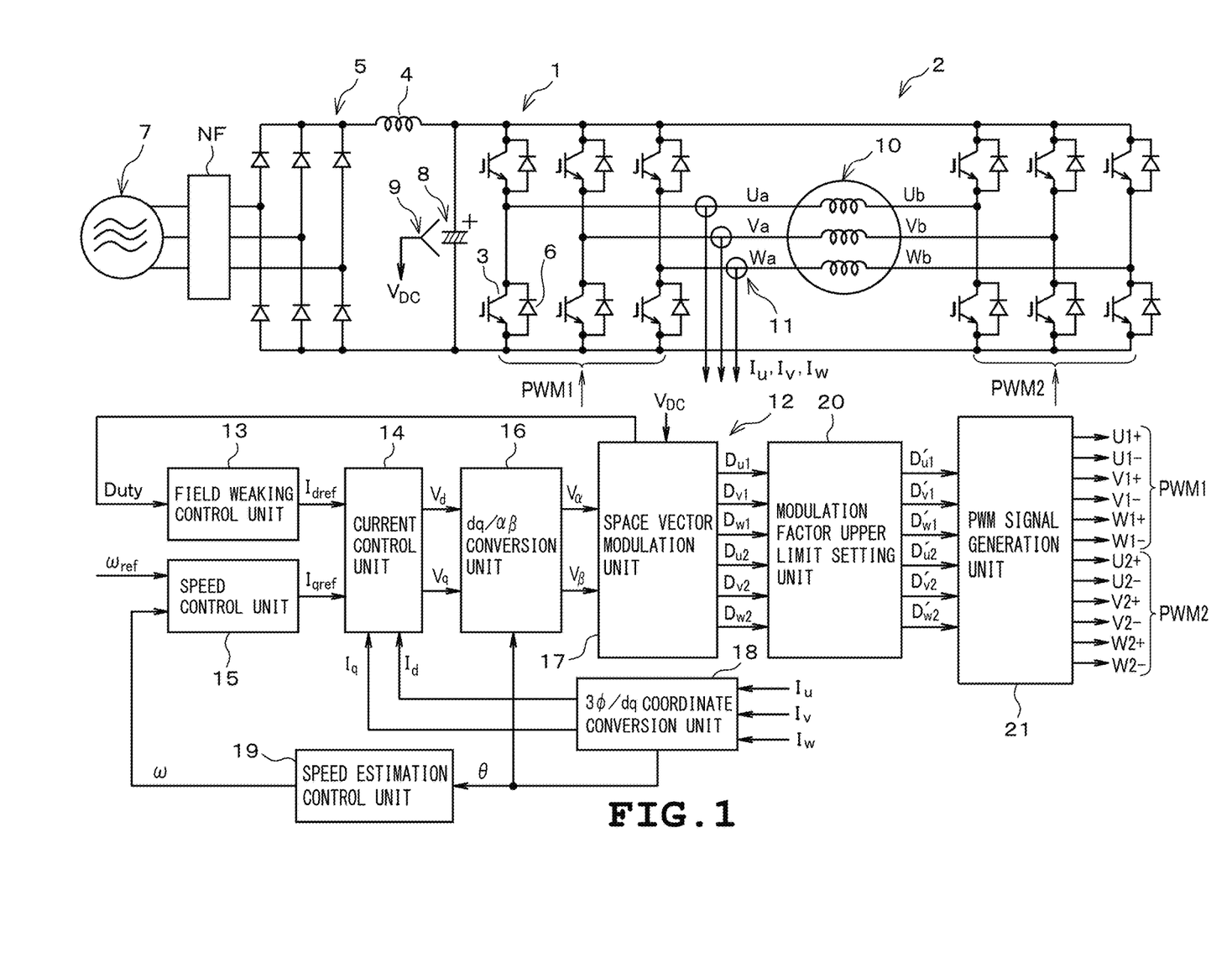
FIG. 1 is a diagram of a first embodiment illustrating a circuit configuration of a motor driving device.

Hereinafter, a first embodiment will be described with reference to FIGS. 1 to 6. FIG. 1 illustrates a configuration of a motor driving system according to the present embodiment. Although a three-phase permanent magnet synchronous motor, an induction machine, or the like is conceivable as a motor 10, the motor 10 is assumed to be a permanent magnet synchronous motor, that is, a so-called sensorless DC brushless motor in the present embodiment. Windings of three phases of the motor 10 are not connected to each other, and both terminals of each phase are in an open state. In other words, the motor 10 includes six winding terminals Ua, Va, Wa, Ub, Vb, and Wb. The motor 10 performs variable speed driving of a compressor of an air conditioner, for example.

Each of a primary-side inverter 1 of three phases and a secondary-side inverter 2 of three phases is configured through three-phase bridge connection of IGBTs 3 that are switching elements, and these are connected in parallel to a converter 5 via a direct current reactor 4 on one end side. Note that the primary-side inverter 1 and the secondary-side inverter 2 may be referred to as an INV 1 and an INV 2, respectively. A free wheel diode 6 is connected between a collector and an emitter of each IGBT 3. Each phase output terminal of the inverter 1 is connected to each of the winding terminals Ua, Va, and Wa of the motor 10, and each phase output terminal of the inverter 2 is connected to each of the winding terminals Ub, Vb, and Nb of the motor 10. Note that three single-phase inverters may be used to configure the primary-side inverter 1 and the secondary-side inverter 2.

The converter 5 is a rectifier circuit to which three-phase bridge connection of a diode is established, and the converter 5 is connected on its input side to a three-phase alternating current power source 7 via a noise filter NF. A smoothing capacitor 8 is connected in parallel with the inverter 1 on the side of the direct current reactor 4. A voltage sensor 9 detects a terminal voltage $V_{DC}$ of the smoothing capacitor 8 and outputs the terminal voltage $V_{DC}$ to a control device 12. A current sensor 11 that detects each of phase currents Iu, Iv, and Iw is disposed between each phase output terminal of the inverter 1 and the winding terminals Ua, Va, and Wa, and the detected phase currents Iu, Iv, and Iw are input to the control device 12.

A speed command value $\omega_{Ref}$ is given from a control device in a higher order in a system using the motor 10, for example, a controller of the air conditioner to the control device 12, and control is performed such that an estimated motor speed $\omega$ matches the speed command value $\omega_{Ref}$. The control device 12 generates PWM signals U1+ to W1− and U2+ to W2− to be given to a gate of each IGBT 3 configuring the inverters 1 and 2 on the basis of each of the phase currents Iu, Iv, and Iw detected by the current sensor 11.

A field weakening control unit 13 changes a d-axis current command value $I_{dref}$ that is an output at the time of high-speed rotation of the motor. Specifically, the d-axis current command value $I_{dref}$ is maintained at "0" until a voltage command value $D'_{u1}$ to $D'_{w2}$ of a PWM signal input by a space vector modulation unit, which will be described later, becomes its maximum, and a negative d-axis current command value $I_{dref}$ is generated and is then output to a current control unit 14 in a case where each phase command value of the PWM signal, that is, the voltage command values $D'_{u1}$ to $D'_{w2}$ reach their maximums. Once the negative d-axis current command value $I_{dref}$ is generated, the phases of the currents caused by the inverters 1 and 2 relative to the rotor position of the motor advance. A speed control unit 15 generates a q-axis current command value $I_{qref}$ in accordance with a difference between the speed command value $\omega_{Ref}$ and the motor speed $\omega$ and outputs the q-axis current command value $I_{qref}$ to the current control unit 14.

The current control unit 14 generates a d-axis and q-axis voltages Vd and Vq in accordance with differences between the d-axis and α-axis current command values $Id_{ref}$ and $I_{qref}$ and d-axis and q-axis currents Id and Iq obtained through coordinate conversion of each of the phase currents Iu, Iv, and Iw and outputs the d-axis and q-axis voltages Vd and Vq to a dq/αβ conversion unit 16. The dq/αβ conversion unit 16 converts the d-axis and q-axis voltages Vd and Vq into α-axis and β-axis voltages Vα and Vβ using a rotor rotation position θ of the motor 10 obtained by each of the phase currents Iu, Iv, and Iw and outputs the α-axis and β-axis voltages Vα and Vβ to a space vector modulation unit 17.

A 3φ/dq coordinate conversion unit 18 generates the aforementioned d-axis and q-axis currents Id and Iq by converting the phase currents Iu, Iv, and Iw detected by the current sensor 11 into d-axis and q-axis coordinates and generates the rotor rotation position θ. A speed estimation unit 19 estimates the aforementioned motor speed ω on the basis of the rotor rotation position θ.

The space vector modulation unit 17 performs a space vector operation from the α-axis and β-axis voltages Vα and Vβ, generates pre-correction phase command values of the inverter 1, that is, command values $D_{u1}$, $D_{v1}$, and $D_{w1}$ of output voltages before upper limit restriction and pre-correction phase command values $D_{u2}$, $D_{v2}$, and $D_{w2}$ of the inverter 2 and outputs $D_{u1}$, $D_{v1}$, and $D_{w1}$ and $D_{u2}$, $D_{v2}$, and $D_{w2}$ to a modulation factor upper limit setting unit 20. The modulation factor upper limit setting unit 20 sets an upper limit of a modulation factor of a switching control signal in PWM control to 1.15 which is greater than 1. Voltage command values $D'_{u1}$, $D'_{v1}$, and $D'_{w1}$ that are phase command values, the upper limits of which are set in accordance with this setting, and phase command values $D'_{u2}$, $D'_{v2}$, and $D'_{w2}$ of the inverter 2 are generated and then output to a PWM signal generation unit 21. The modulation factor upper limit setting unit 20 is adapted to changing the pre-correction phase command values $D_{u1}$ to $D_{w2}$ to the pre-correction phase command values $D'_{u1}$, $D'_{v1}$, and $D'_{w1}$ and $D'_{u2}$, $D'_{v2}$, and $D'_{w2}$, the upper limits thereof are restricted to 1.15 in a case where the pre-correction phase command values $D_{u1}$ to $D_{w2}$ exceed 1.15. Therefore, the maximum value of the modulation factors of the phase command values, that is, command values $D'_{u1}$ to $D'_{w2}$ of the output voltages is 1.15.

The PWM signal generation unit 21 generates and outputs switching signals with a predetermined duty to be given to the gate of each of the IGBTs 3 configuring the inverters 1 and 2, that is, PWM signals U1±, V1±, W1±, U2±, V2±, and W2± from each of the input phase command values $D'_{u1}$ to $D'_{w2}$. The generation of the PWM signals that are switching signals is performed through size comparison between each of the phase command values $D'_{u1}$ to $D'_{w2}$ and a triangular wave that is a carrier and has a predetermined carrier frequency, for example, 5 kHz, which will be described later in detail.

Next, control for curbing a zero-axis current of a carrier frequency component in the present embodiment will be described. The zero-axis current is generated by a zero-axis voltage, and the zero-axis voltage is a difference of average values of the voltages in the three phases of each of the inverters 1 and 2. Polarity of the zero-axis voltage varies between positive and negative polarities in accordance with a switching state of each of the inverters 1 and 2, and the zero-axis current increases during a period in which the zero-axis voltage is being generated on the positive side while the zero-axis current decreases during a period in which the zero-axis current is being generated on the negative side. Therefore, if the zero-axis voltage becomes zero, then the variations in carrier frequency component that is ripple of the zero-axis current also disappears.

Also, a generated state of the zero-axis voltage depends on the numbers of phases in the inverters 1 and 2 in which the IGBTs 3 are turned on, and when the numbers of phases in which the IGBTs 3 are turned on are different between the inverters 1 and 2, the zero-axis voltage is positively or negatively generated in accordance with the difference therebetween in other words, if it is possible to cause the numbers of ON phases in the inverters 1 and 2 to become the same, then the zero-axis voltage is not generated. However, it is not possible to constantly cause the numbers of ON phases in the inverters 1 and 2 to match each other in sinusoidal power distribution and sinusoidal modulation that are typically performed.

Here, the switching patterns of the inverters 1 and 2 for curbing the zero-axis current will be discussed in terms of space voltage vectors. There are eight space voltage vectors V0 to V7 in a typical case where power distribution to the motor is performed by a three-phase inverter. For example, V1(100) denotes a state where an upper arm in the U phase is turned on while upper arms in the V and W phases are turned off. In contrast, the number of types of space voltage vectors in a case wherein power distribution to an open winding motor is performed by two inverters as in the present embodiment is 8×8=64.

When a relationship between the space voltage vectors and the zero-axis voltage is taken into account, a switching pattern in which a voltage to be applied to the motor 10 is generated while a zero-axis voltage equally acting on the three phases is not generated is a switching pattern in which the numbers of ON phases in the two inverters 1 and 2 are the same and at least two of phases that are turned on do not match. As the patterns, twelve patterns V15, V24, V26, V35, V31, V46, V42, V51, V53, V62, V64, and V13 are present in 64 space voltage vectors.

Figure 2:
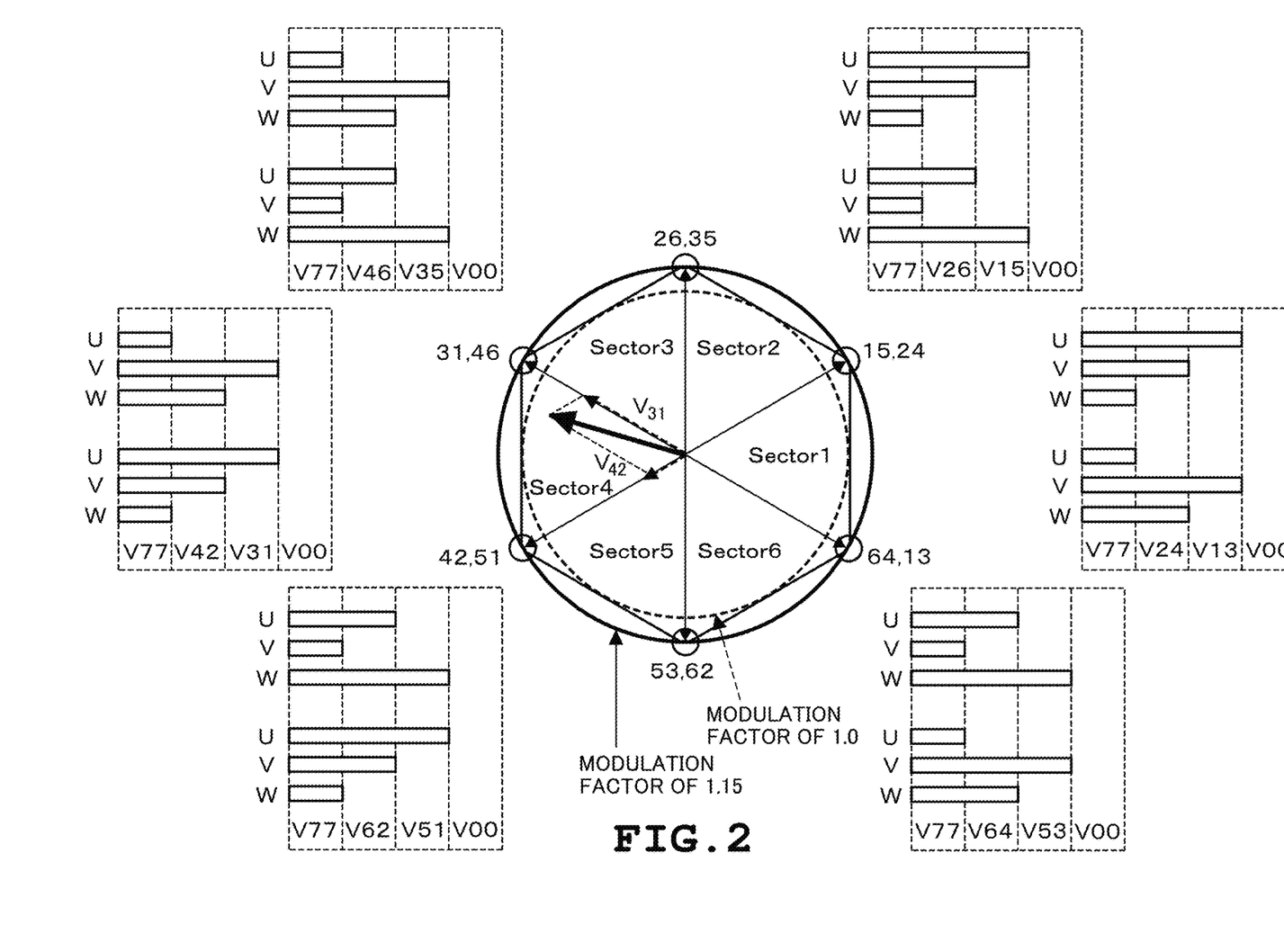
FIG. 2 is a diagram illustrating a space voltage vector.

FIG. 2 illustrates a PWM waveform corresponding to each voltage vector together. A regular hexagon is drawn by arranging pairs each including two of the above twelve patterns at apexes and is split into six sectors. For example, a power distribution time of each of the voltage vectors V42 and V31 is adjusted to output a vector belonging to the sector 4 indicated by the arrow in FIG. 2. The PWM waveform of each voltage vector is as follows.

V42: Inverter 1 (U, V, W)=(OFF, ON, ON)
Inverter 2 (U, V, W)=(ON, ON, OFF)
V31: Inverter 1 (U, V, W)=(OFF, ON, OFF)
Inverter 2 (U, V, W)=(ON, OFF, OFF)

V77 in which all the phases of the inverters 1 and 2 are turned on and V00 in which all the phases are turned off are added thereto. As is known from the PWM waveform of each vector, the numbers of ON phases of the inverters 1 and 2 completely match each other and the zero-axis voltage V0 is not generated if only these patterns are used. In other words, it is possible to curb ripple of the carrier component of the zero-axis current if power distribution is performed in the PWM switching pattern.

In the present embodiment, first and second vector patterns corresponding to first and second switching patterns are defined as follows.
<First Vector Pattern>

A pattern in which a voltage to be applied to the motor 10 is generated while a zero-axis voltage equally acting on the three phases is not generated. This corresponds to the aforementioned twelve patterns.
<Second Vector Pattern>

A pattern in which a voltage acting between phases of the motor 10 is not generated while a zero-axis voltage equally acting on the three phases is not generated. This is a second vector pattern in which V77 and V00 are common to all the sectors.

The space vector modulation unit 17 determines which of six sectors the space voltage vector determined by the magnitudes of the input α-axis and β-axis voltages Vα and Vβ belongs to and selects two first vector patterns in accordance with the determined sector. As described above, the first vector patterns are V42 and V31 if the vector belongs to the sector 4, and the arithmetic operation is performed using the α-axis and β-axis voltages Vα and Vβ including the magnitudes of V77 and V00. Since the magnitudes of the three phase voltages of each of the inverters 1 and 2 are obtained through the above arithmetic operation, the magnitudes are divided by the direct current voltage $V_{DC}$ to determine and output the phase command values $D_{u1}$ to $D_{w2}$.

Next, a relationship between the modulation factor and the common mode voltage will be examined. The modulation factor is obtained from a voltage to be output by the inverter, and the output voltage command increases as the modulation factor increases. If the modulation factor becomes a value exceeding "1", it is possible to increase the output voltage while harmonic distortion and controllability of the output voltage are degraded. A modulation factor up to about 1.15 is typically used.

In the space voltage vector diagram in FIG. 2, the modulation factor on the circumference which is an inscribed circle of the regular hexagon and is illustrated by the dashed line is 1.0, and if it is expanded to the regular hexagon in contact with a circumference that is a circumscribed circle and is illustrated by the solid line, the modulation factor is $2/\sqrt{3} \approx 1.15$. If the modulation factor exceeds 1.0, generation of a so-called "complete ON" section in which the switching element of the upper phase of the inverter continues ON over a plurality of carrier cycles in PWM control and a so-called "complete OFF" section in which OFF is continued over the plurality of carrier cycles is started.

Figure 3:
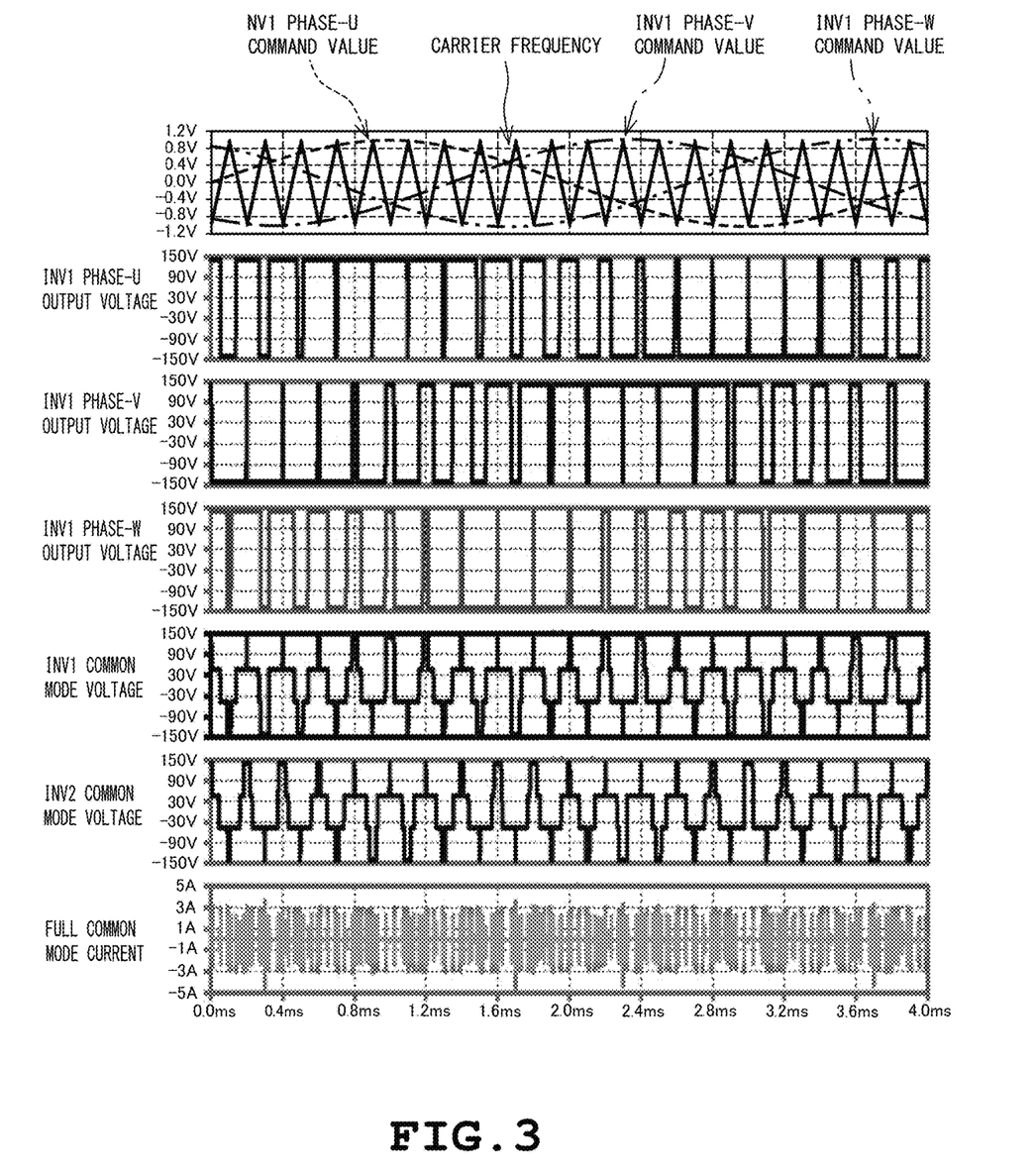
FIG. 3 is a diagram illustrating each signal waveform in simulation in a case where a modulation factor is assumed to be 1.0 in typical sinusoidal modulation.
Figure 4:
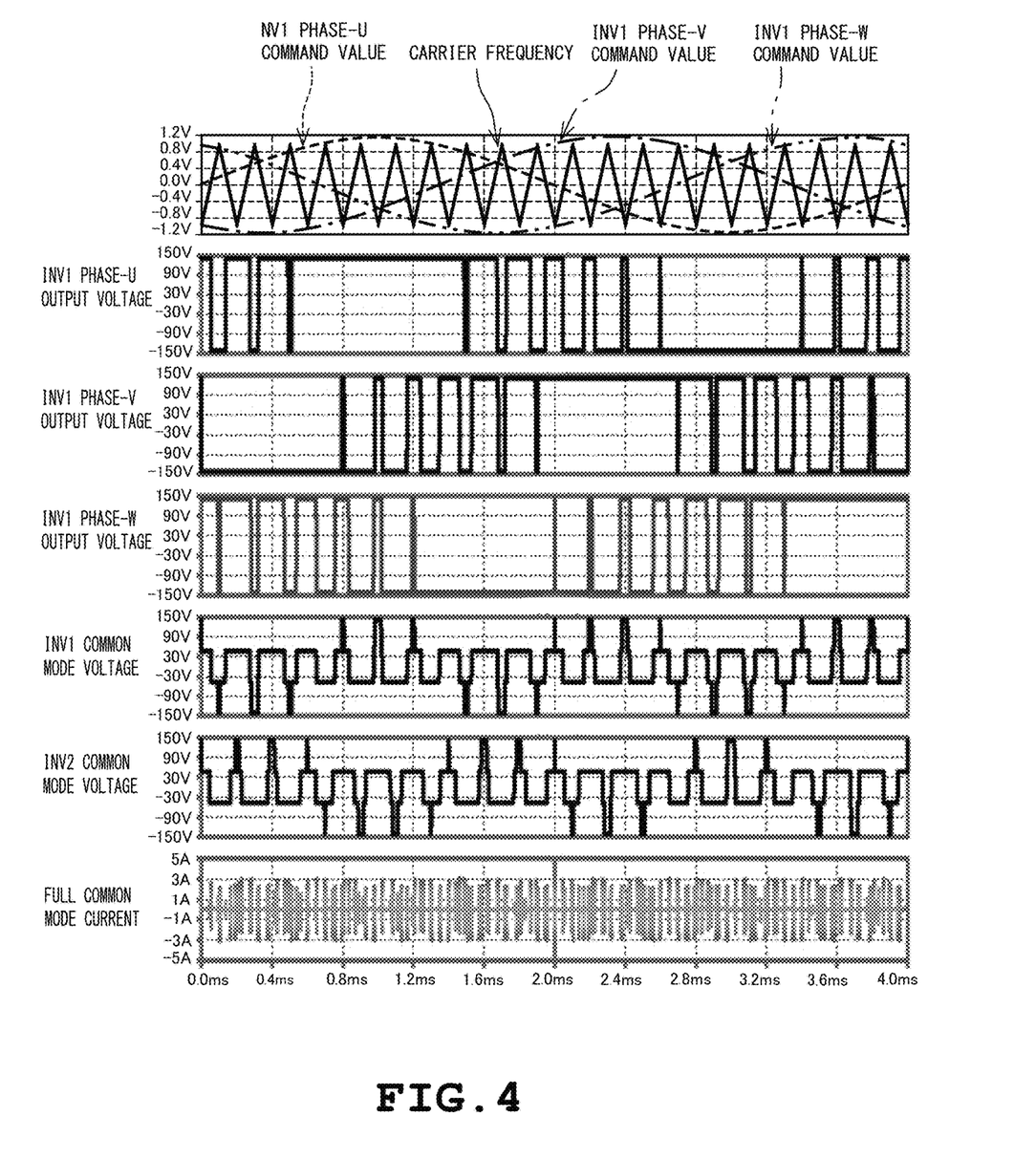
FIG. 4 is a diagram illustrating each signal waveform in simulation in a case where the modulation factor is assumed to be 1.15 in the typical sinusoidal modulation.

FIGS. 3 and 4 illustrate, from the upper side to the lower side, a waveform for generating a sinusoidal modulation signal in typical sinusoidal modulation, phase output voltage waveforms of the inverter 1 in a case where the modulation factor is set to 1.0 and 1.15, and common mode voltage waveforms and common mode current waveforms of the inverters 1 and 2. In the generation of the sinusoidal modulation signal at the uppermost part, size comparison is performed between phase command values $D'_{u1}$ to $D'_{w2}$ and the carrier signal of the triangular wave changing within a range of −1.0 V to +1.0 V along the vertical axis in the uppermost diagram in FIGS. 3 and 4. In this manner, a duty, that is ON and OFF timings of the switching elements in the inverters 1 and 2 during the carrier cycle of the triangular wave is determined.

The amplitude of the carrier signal of the triangular wave corresponds to a direct current voltage. In a case where the three-phase alternating current power source 7 is a 200 V power source and the converter 5 is a full-wave rectifier, for example, the output voltage of the converter 5, that is, the direct current power source voltage Vdc of the inverters 1 and 2 is about 280 V. Therefore, the amplitude width of −1.0 V to +1.0 V of the carrier signal of the triangular wave corresponds to −Vdc/2 (about −140 V) to Vdc/2 (about +140 V) as the output voltage of the inverter.

Here, the modulation factor becomes 1.0 if the variation range of the phase command values to $D'_{u1}$ to $D'_{w2}$ is −1.0 V to +1.0 v, and the modulation factor becomes 1.5 if the variation range of the phase command values $D'_{u1}$ to $D'_{w2}$ is −1.15 V to +1.15 V. If the variation range of the phase command values $D'_{u1}$ to $D'_{w2}$ falls within the range of −1.0 V to +1.0 V, the modulation factor is less than 1.0.

If the modulation factor becomes 1.15, then the phase command values $D'_{u1}$ to $D'_{w2}$ exceed the amplitude of the carrier, that is, the range of −1.0 V to +1.0 V along the vertical axis in FIGS. 3 and 4 near the maximum amplitude of the sine wave, the section in which the switching element is in the complete ON state thus increases, the complete ON is alternately repeated between the upper phase and the lower phase in accordance with the polarity of the output voltage and the positive or negative motor current.

In this case, if the inverter output voltage is defined with reference to the neutral point of the direct current part, then the output voltage when the upper phase is turned on is $V_{dc}/2$, and the output voltage when the lower phase is turned on is $-V_{dc}/2$. Furthermore, the output voltage is $V_{dc}/6$ or $-V_{dc}/6$ depending on switching states of the other two phases. The common mode voltage is an average value of the three phase output voltages and has waveforms in four levels in all sections when the modulation factor is equal to or less than 1.0. Therefore, a change width $\Delta V_{com}$ of the common mode voltage is $V_{dc}/3$.

If the positive motor current period in a case where the modulation factor exceeds 1.0 is considered, then the output voltage of one phase is fixed to $V_{dc}/2$, and levels of the common mode voltage become three levels, namely $V_{dc}/2$, $V_{dc}/6$, and $-V_{dc}/6$ depending on switching states of the other two phases. Also, the negative motor current period in the same case will be considered, then the output voltage of one phase is fixed to $-V_{dc}/2$, the levels of the common mode voltage become three levels, namely $V_{dc}/6$, $-V_{dc}/6$, and $-V_{dc}/2$ depending on switching states of the other two phases. In addition, since the phase difference of modulation waves of the inverters 1 and 2 is 180°, the output voltages have mutually opposite phases, and the waveform of the common voltage also has a phase like an opposite phase.

Since the common mode current flows to the ground as the change width $\Delta V_{com}$ of the common mode voltage increases and as the number of times of variation increases, electro-magnetic interface (EMI) properties of the noise terminal voltage and the like are degraded. As is known from FIGS. 3 and 4, it is not possible to significantly reduce the number of times of variation of the common mode voltage even if the modulation factor is increased and to effectively reduce noise in typical sinusoidal modulation.

Figure 5:
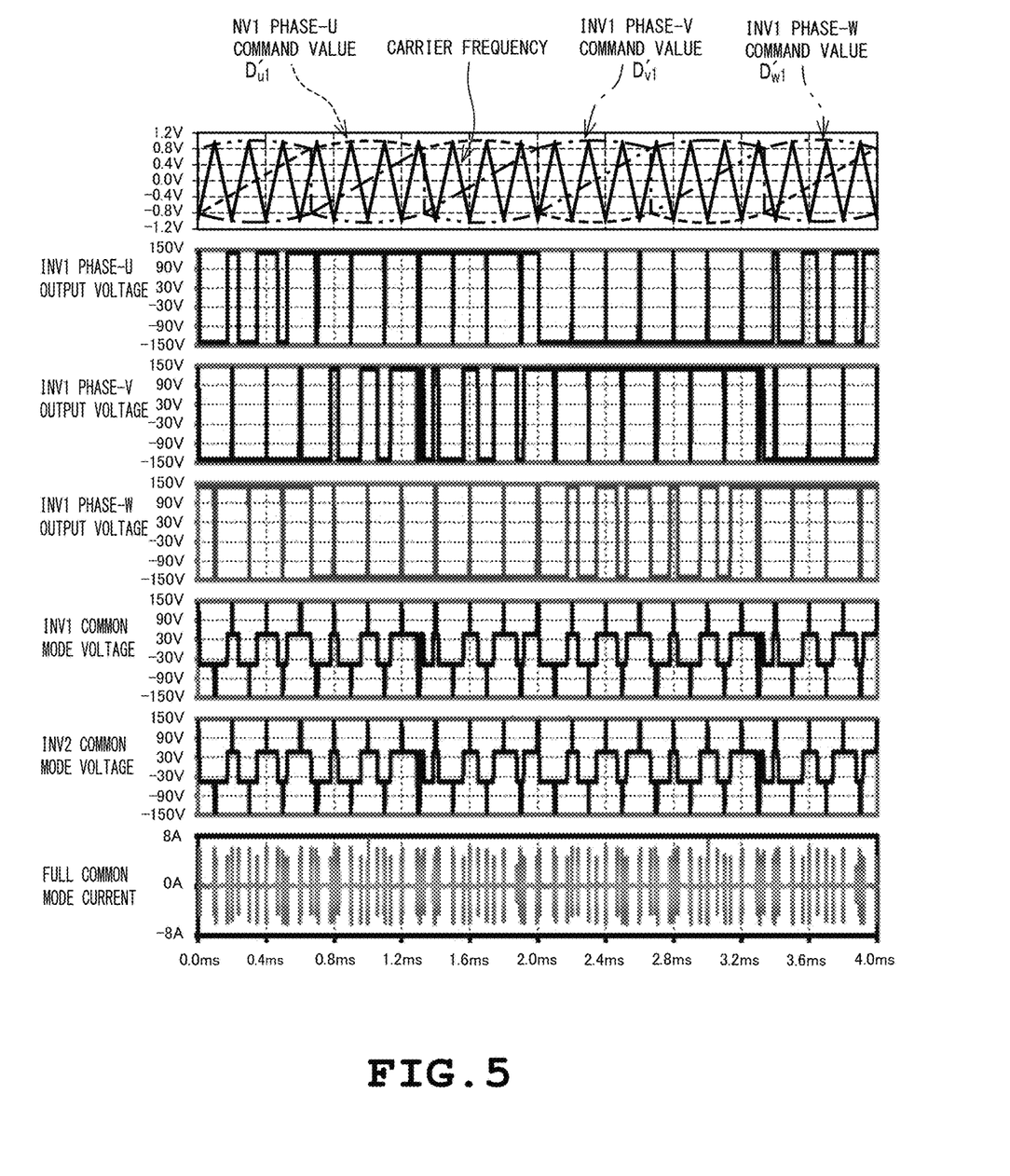
FIG. 5 is a diagram illustrating each signal waveform in simulation in a case where the modulation factor is assumed to be 1.0 under control in the first embodiment.
Figure 6:
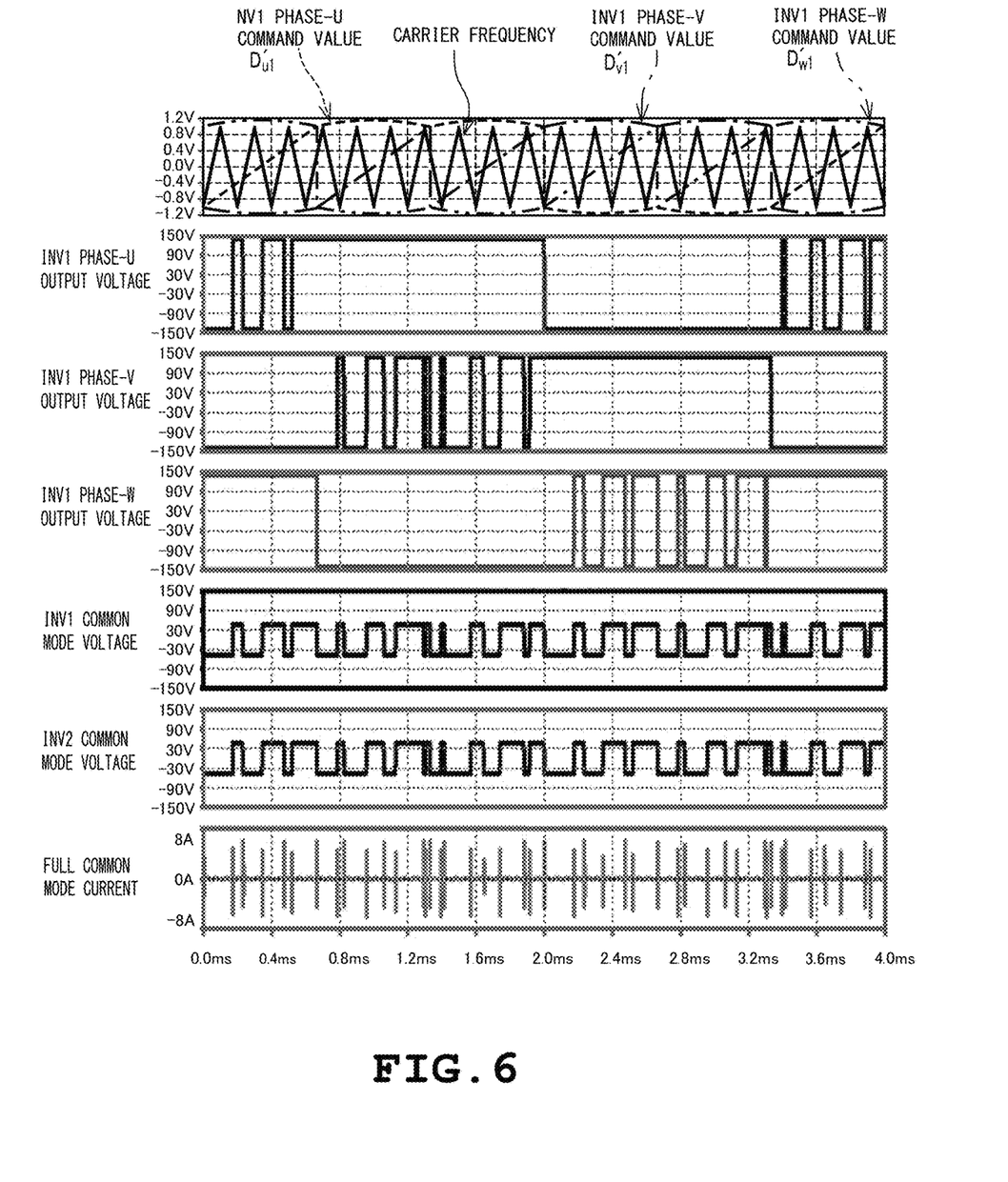
FIG. 6 is a diagram illustrating each signal waveform in simulation in a case where the modulation factor is assumed to be 1.15 under control in the first embodiment.

On the other hand, FIGS. 5 and 6 are diagrams corresponding to FIGS. 3 and 4 in a case where the modulation factor is set to 1.0 and 1.15 in the control scheme in the present embodiment. As described above, since only the switching patterns which the zero-axis voltage is not generated are selected in the first embodiment, the voltage command values $D'_{u1}$ to $D'_{w2}$ of each phase do not have sinusoidal shapes. It is remarkable that if this switching pattern is employed, a command value of another phase is always its minimum value in a period during which a command value of one certain phase, that is, one of $D'_{u1}$ to $D'_{w2}$ is its maximum value.

If the modulation factor exceeds 1.0 as illustrated in FIG. 5, then command values in all the phases continuously exceed +1.0 V near the locations where the command values are their maximum values, and the command values are continuously below −1.0 V, that is, smaller than −1.0 V which is the minimum value of the triangular wave that is a carrier near the locations where the command values are their minimum values. In this period, the upper phase as the one phase of the inverter is brought into the complete ON state, and the upper phase as another phase is brought into the complete OFF state, in other words, the lower phase is brought into the complete ON state. Then, only the remaining one phase is brought into a state where switching is performed.

Furthermore, if the modulation factor increases and becomes 1.15, a period during which the command values continuously exceed 1.0 V and a period during which the command values are continuously below −1.0 V are expanded, and the upper phase as the one phase of the inverter is brought into a complete ON state, the upper phase as another phase is brought into a complete OFF state, and only the remaining one phase is brought into a state where switching is performed over substantially the entire periods as illustrated in FIG. 6. In this state, the common voltage can be only in two levels, namely $V_{dc}/6$ and $-V_{dc}/6$. In other words, it is understood that the variation width and the number of times of variation of the common mode voltage significantly decrease and the variations in common mode current decreases as the modulation factor increases from 1.0.

Note that although the peak value of the common mode current increases in FIGS. 5 and 6 as compared with that in FIGS. 3 and 4, this is a result of a simulation, and the peak value of the common mode current is substantially the same as that in FIGS. 3 and 4 even under control in FIGS. 5 and 6 since deviation of a short time occurs in a change in inverter output value in response to ON and OFF of each of the switching elements of the inverters 1 and 2 and deviation also occurs in timings at which the common mode voltage chances in practice.

As described above, according to the present embodiment, the primary-side inverter 1 that is connected to three output terminals from among six output terminals included by the motor 10 with the open winding structure in which the windings of three phases are independent of each other and the secondary-side inverter 2 that is connected to the remaining three output terminals are included, and the control device 12 controls the current to be distributed to the motor 10 and the rotation speed by controlling the primary-side and secondary-side inverters 1 and 2. Direct current power is supplied to the inverters 1 and 2, the control device 12 performs PWM control on the inverters 1 and 2 by using a switching pattern in which the numbers of phases where each IGBT 3 is turned on are equal, and in the switching pattern, ON of only an upper IGBT 3 is continued in one phase from among the three phase outputs, ON of only a lower IGBT 3 is continued in another phase, and the upper and lower IGBTs 3 are alternately turned on and off in the remaining one phase in one cycle of an electric angle of the motor 10 over a plurality of cycles.

In this manner, it is possible to reduce the number of times of variation and the variation width of the common mode voltage, to reduce a change frequency of the common mode current, and to improve EMI properties. Such control is effective in a region where the motor 10 rotates at a high speed, for example. At this time, it is possible to further reduce the number of times of variation of the common mode voltage and to further improve the EMI properties by setting the modulation factor to be greater than 1.0.

Figure 7:
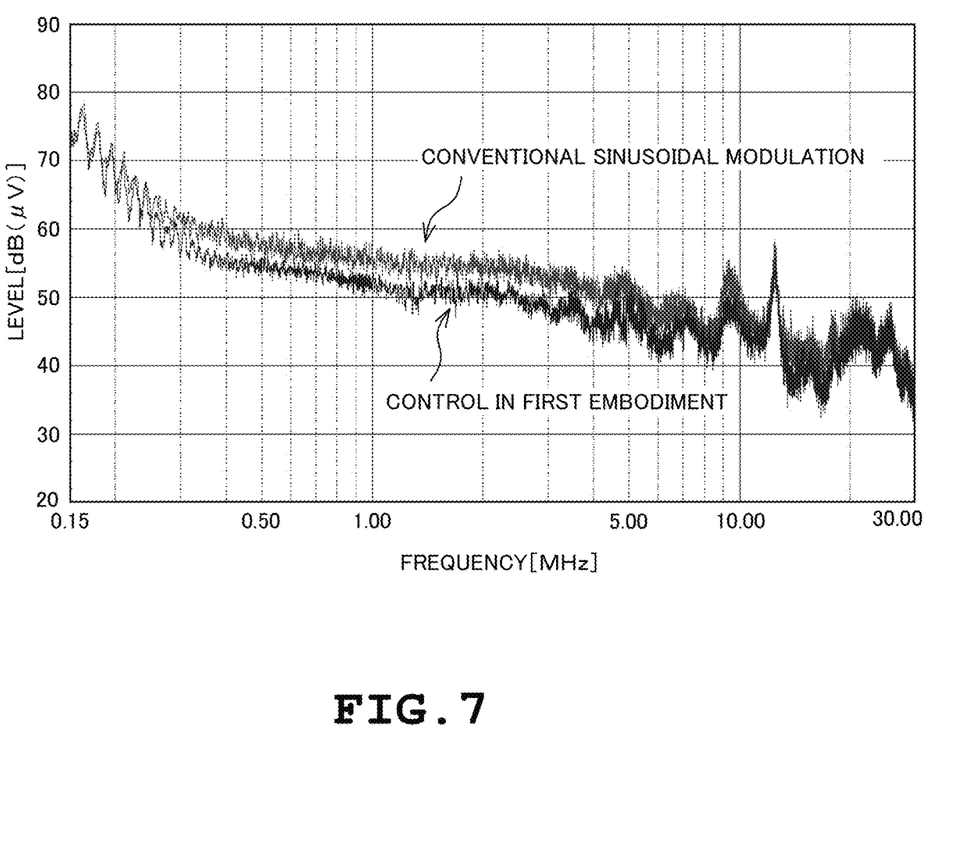
FIG. 7 is a diagram illustrating waveforms of noise terminal voltages in a case where the modulation factor is assumed to be 1.15 in conventional sinusoidal modulation and under control in the first embodiment.

It is understood in FIG. 7 that in a case where the modulation factor is 1.15, a noise reduction effect of equal to or greater than 3 dB is achieved over a wide frequency range of the noise terminal voltage under the control in the first embodiment as compared with the conventional sinusoidal modulation control.

Second Embodiment

Figure 8:
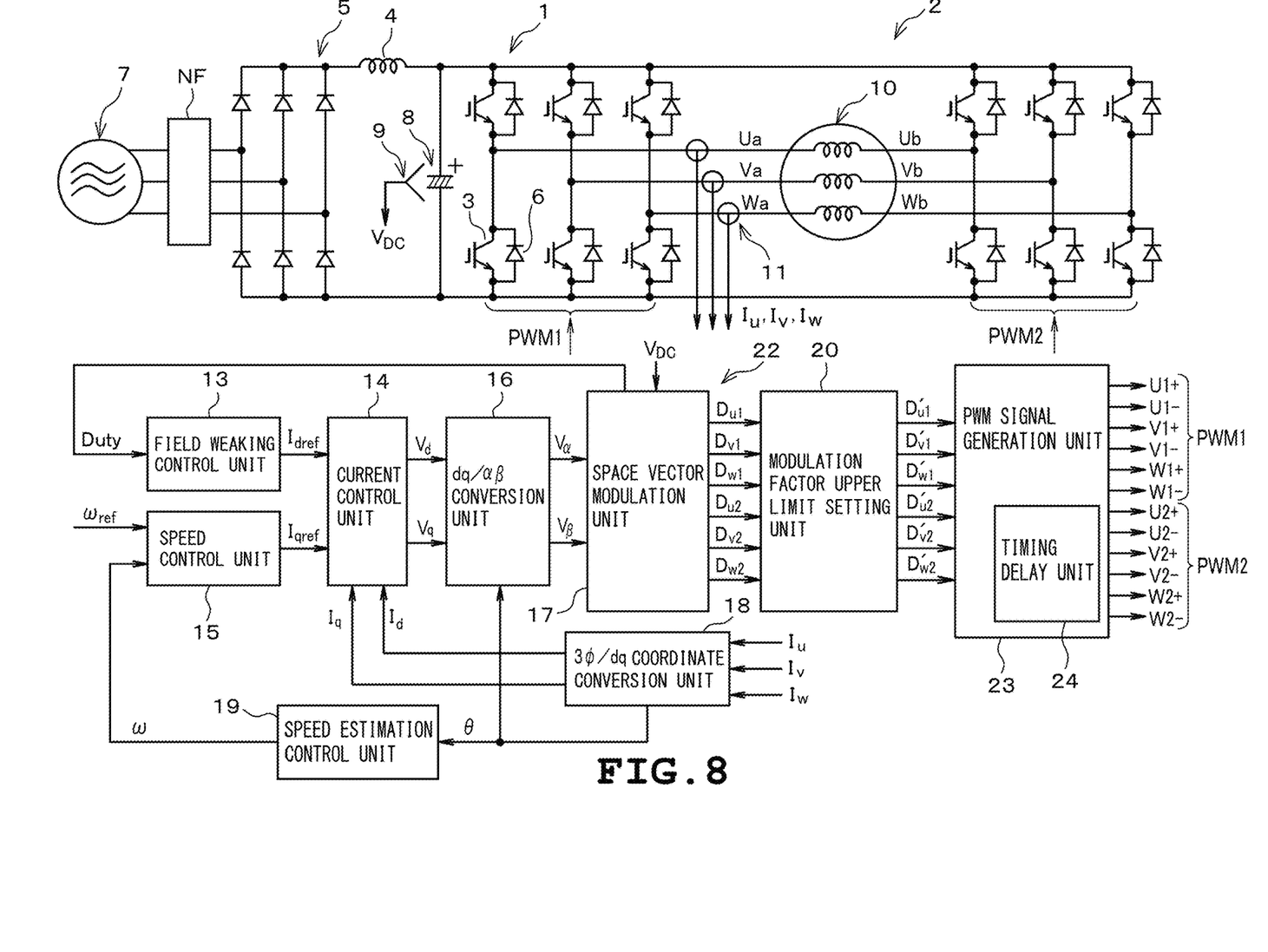
FIG. 8 is a diagram of a second embodiment illustrating a circuit configuration of a motor driving device.

Hereinafter, the same reference signs will be applied to the same parts as those in the first embodiment, description thereof will be omitted, and different parts will be described. As illustrated in FIG. 8, a control device 22 according to the second embodiment includes a timing delay unit 24 inside a PWM signal generation unit 23 that is provided instead of the PWM signal generation unit 21. The timing delay unit 24 applies a delay time from about several hundreds of ns to about several μs to PWM signals U2±, V2±, and W2± to be given to gates of IGBTs 3 on the side of the inverter 2.

In other words, once switching of the inverters 1 and 2 is performed at a completely equal timing, common mode voltage waveforms thereof become equal to each other as illustrated in FIGS. 5 and 6. Then, variations in common mode voltage are applied at the same time from both the winding terminals Ua to Wa and the wind in terminals Ub to Wb of the motor 10, and the peak of the common mode current becomes double. Although the peak value of the common mode current decreases since deviation of a very short time actually occurs in a change in inverter output voltage in response to ON and OFF of each of the switching elements of the inverters 1 and 2, the timing delay unit 24 actively shifts the timings of the switching performed in the inverters 1 and 2 by actively applying a delay time to the PWM signals U2±, V2±, and W2± on the side of the inverter 2 in order to further reliably shift the timing of a change in common mode voltage, and the peak of the common mode current is thereby reduced.

Third Embodiment

Figure 9:
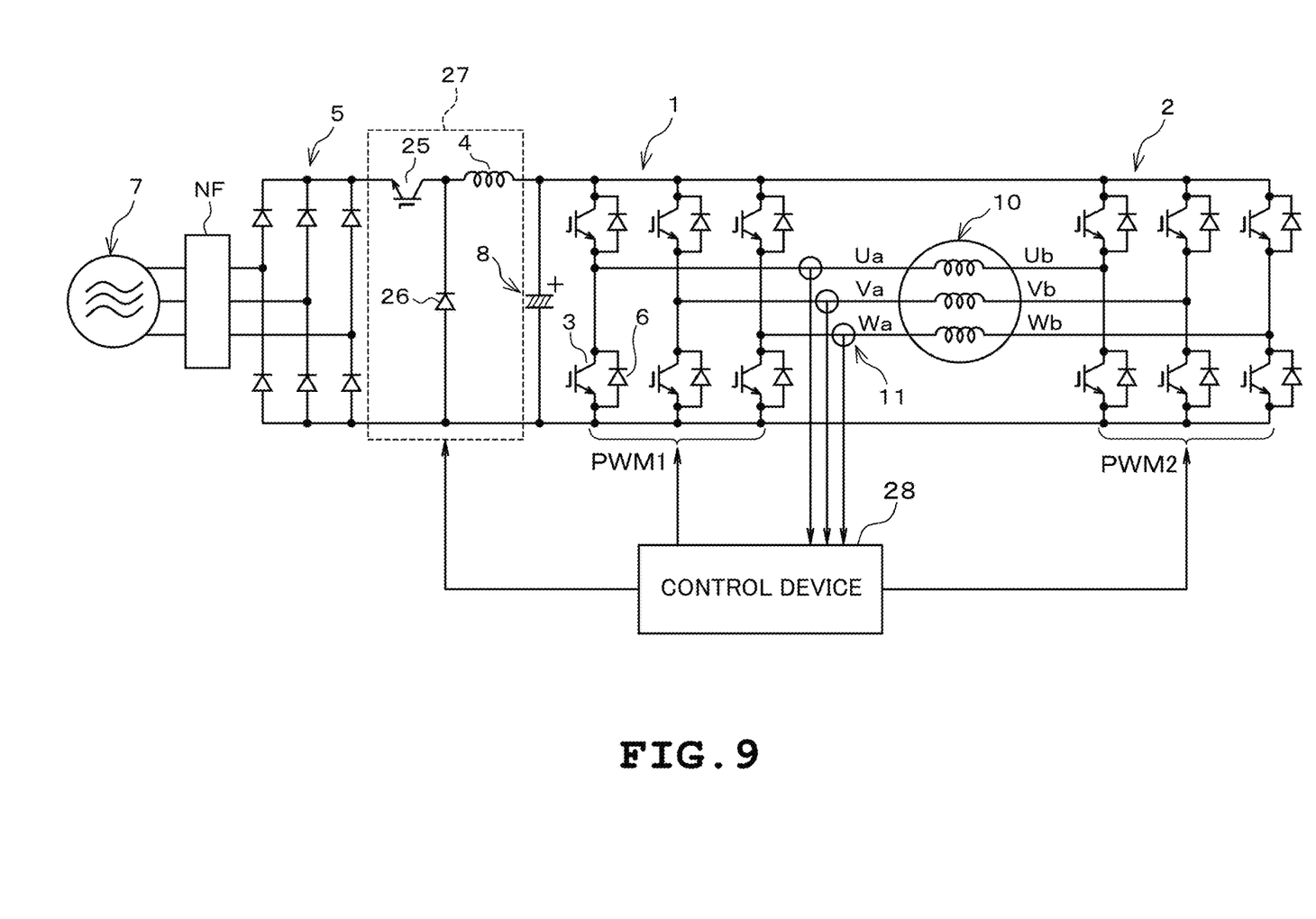
FIG. 9 is a diagram of a third embodiment illustrating a circuit configuration of a motor driving device.

As illustrated in FIG. 9, an IGBT 25 is connected between a converter 5 and a reactor 4 with a collector located on the side of the reactor 4 in a configuration in a third embodiment. Also, a diode 26 in the opposite direction is connected between the collector of the IGBT 25 and the ground. Additionally, the reactor 4, the IGBT 25, and the diode 26 configure a step-down circuit 27. A control device 28 provided instead of the control device 12 controls switching of the IGBT 25 as well.

The control device 28 can always set a modulation factor of the inverters 1 and 2 to be greater than 1.0, for example, even in a case where a motor 10 is driven at a low rotation frequency, by the step-down circuit 27 performing step-down control of an output voltage of the converter 5. In this manner, it is possible to reduce the common mode current and to improve EMI properties by employing a switching pattern in which ON of only the upper switching element is continued in one phase from among three phase outputs, ON of only the lower switching element is continued in another phase, and the upper and lower switching elements are alternately turned on and off such that mutual phases are opposite in the remaining phase in one cycle of an electric angle of the motor over a plurality of carrier cycles in PWM control in the entire range or a wide range of a variable speed operating range of the motor 10. Conversely, the output voltage of the step-down circuit 27 is adjusted such that the modulation factor is larger than 1.0 for a necessary rotation frequency of the motor 10. For example, in order to maintain the modulation factor of 1.15, the output voltage of the step-down circuit 27 is lowered when the rotation frequency of the motor 10 is low, and the output voltage of the step-down circuit 27 is raised as the rotation frequency of the motor increases.

Other Embodiments

The modulation factor is not limited to 1.15, and it is only necessary to set the modulation factor to be greater than 1.0.

In the second embodiment, the PWM signal of the primary-side inverter 1 may be delayed.

Although some embodiments of the present invention have been described, these embodiments have been proposed as examples and are not intended to limit the scope of the invention. These novel embodiments can be implemented in other various modes, and various omissions, replacements, and modifications can be made without departing from the gist of the invention. These embodiments and modifications thereof are included in the scope and the gist of the invention and are included in a scope that is equivalent to the invention described in the claims.

The invention claimed is:

1. An open winding motor driving device comprising:
a primary-side inverter that is connected to three output terminals from among six output terminals included in a motor with an open winding structure including the six output terminals and including windings of three phases that are independent of each other;
a secondary-side inverter that is connected to the remaining three output terminals of the output terminals of the motor;
a control unit that controls a current to be distributed to the motor and a rotation speed by controlling the primary-side and secondary-side inverters,
wherein direct current power is supplied to the primary-side and secondary-side inverters,
both the primary-side and the secondary-side inverters comprise respectively three upper switching elements and three lower switching elements,
the control unit performs PWM control on the primary-side and secondary-side inverters by using a switching pattern in which the numbers of phases where each of the switching elements comprising the primary-side and the secondary-side inverters is turned on are equal, and
the opening winding motor driving device has a switching pattern in which ON of only an upper switching element of the three upper switching elements is continued in one phase out of three phase outputs, ON of only a lower switching element of the three lower switching elements is continued in another phase, and the upper and lower switching elements are alternately turned on and off such that mutual phases are opposite in the remaining one phase, in one cycle of an electric angle of the motor over a plurality of carrier cycles in the PWM control.

2. The open winding motor driving device according to claim 1, wherein the control unit outputs a PWM signal such that timings for performing switching are shifted between the primary-side inverter and the secondary-side inverter.

3. The open winding motor driving device according to claim 2,
wherein direct current power is supplied from a converter connected to an alternating current power source to the primary-side and secondary-side inverters, and
the control unit controls an output voltage of the converter such that a modulation factor of the PWM signal is equal to or greater than "1".

4. The open winding motor driving device according to claim 1,
wherein direct current power is supplied from a converter connected to an alternating current power source to the primary-side and secondary-side inverters, and
the control unit controls an output voltage of the converter such that a modulation factor of the PWM signal is equal to or greater than "1".

* * * * *